Aug. 10, 1965 H. LANGE ETAL 3,200,188

CATHODE RAY TUBES WITH INSULATED IMPLOSION PROTECTIVE FRAME

Filed March 15, 1963

3 Sheets-Sheet 1

Herbert Lange
Johannes Ritter
Walter Schaffernicht

Inventors

By: Spencer & Kaye

Attorneys

Herbert Lange
Johannes Ritter
Walter Schaffernicht
Inventors

By: Spencer & Kaye
Attorneys

Herbert Lange
Johannes Ritter
Walter Schaffernicht
Inventors

By: Spencer & Kaye
Attorneys

United States Patent Office 3,200,188
Patented Aug. 10, 1965

3,200,188

CATHODE RAY TUBES WITH INSULATED IMPLOSION PROTECTIVE FRAME

Herbert Lange, Ulm (Danube), Johannes Ritter, Herrlingen, and Walter Schaffernicht, Ulm (Danube), Germany, assignors to Telefunken Patentverwertungs-G.m.b.H., Ulm (Danube), Germany Filed Mar. 15, 1963, Ser. No. 265,549
Claims priority, application Germany, Mar. 21, 1962, T 21,799; June 19, 1962, T 22,320; Feb. 21, 1963, T 23,420
15 Claims. (Cl. 174—50.51)

The present invention relates to cathode ray tubes.

More particularly, the present invention relates to an implosion protective device for cathode ray tubes, particularly television picture tubes, which device comprises a frame that surrounds the tube in the region of its maximum circumference, which is generally the region where the cone of the tube joins the screen side.

The effects of an implosion may be reduced by providing picture tubes with a rigid frame which surrounds the tube at the region of maximum circumference. Such frame consists, for example, of two frame parts each of which has a circumferential flange by means of which the two parts are joined together. These parts may, for instance, be made of metal. Inasmuch as such frames can also be used for connecting the picture tube to the chassis of the television set or other apparatus of which the tube is a part, an advantageous chassis and/or housing configuration can be obtained by letting the picture tube, together with a part of the frame, project forwardly out of the housing. In that case, however, care must be taken to protect persons from the dangerously high electrical voltages which the chassis and hence the metal parts of the frame may carry, and it is, therefore, a basic object of the present invention to provide an implosion protective device for cathode ray tubes which is so constructed that persons touching the screen-side frame portion are not subjected to the high electrical potential of a chassis to which the tube is connected by means of the frame. According to the present invention, this object is accomplished by providing insulation which overlies the exposed side of the screen-side frame portion. This insulation may be constituted by a layer of suitable material which covers the exposed side of the screen-side frame portion, or the screen-side frame portion may be made entirely of insulating material, or a suitably configured insulating cap may be provided.

The present invention relates further to methods for applying the insulation to the frame.

Additional objects and advantages of the present invention will become apparent upon consideration of the following description when taken in conjunction with the accompanying drawings in which.

Figure 1:
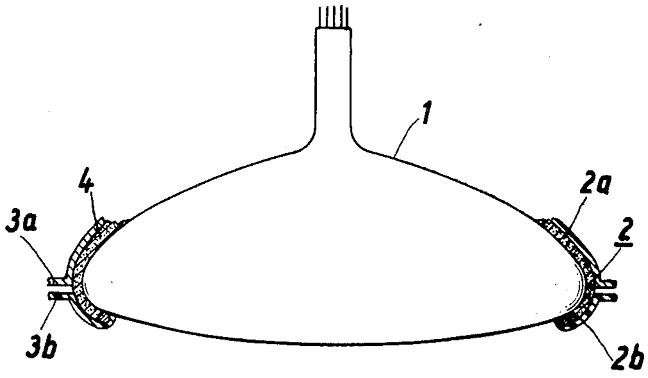
FIGURE 1 is a sectional view of a cathode ray tube equipped with an implosion protective device according to the present invention.

Referring now to the drawings and to FIGURE 1 thereof in particular, the same shows a picture tube 1 having at its front a screen portion and at its rear a cone portion, the juncture of which portions constitutes the region of maximum circumference of the tube. The tube is encompassed in the region of this juncture by an implosion protective frame 2, the latter being made of two parts such as a cone-side strap *2a* and a screen-side strap *2b* having flanges *3a* and *3b*, respectively, by means of which the straps are connected together. The flanged connection *3a*, *3b*, may at the same time be used to attach the tube to a chassis or housing (not shown). The frame is generally connected to the wall of the tube by means of a cementing filler mass 4.

The frame may, alternatively, consist of a single preformed metal part.

According to the present invention, the front or screen-side frame part *2b* of a two-piece frame 2 consists of insulating material, which may be any suitable plastic that is rigid at temperatures up to about 80° C., this being the operating temperature of present day cathode ray tubes. For example, the screen-side frame part may be made of a polyester glass fiber mixture.

Alternatively, the screen-side frame part may be made of metal but be provided, at its outer surface, with an insulating coating which can, for example, be applied by the so-called whirl sintering process. Such a plastic coating, if sufficiently thick to possess the necessary dielectric strength, also has sufficient mechanical strength. The mechanical strength is of significance in that the coating has to be able to withstand minor damage, such as scratches, which occur during normal use without, however, losing its insulating characteristics.

Alternatively, a metallic screen-side frame part may have its surface covered with a foil made of synthetic material. Such a foil can be applied by a vacuum plating process in which the suction causes the foil to flap onto the frame surface. In order to make sure that the foil will lie properly against the surface, it may be expedient to provide the frame with small openings which are distributed over the surface, particularly at those places at which the frame is curved, such as at the fillets.

Figure 2:
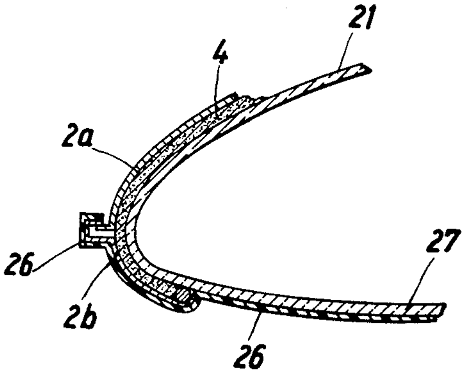
FIGURE 2 is a fragmentary sectional view of a cathode ray tube equipped with a two-piece implosion protective device according to the present invention.

FIGURE 2 shows the picture tube 21 being encompassed, at its region of maximum circumference, with two interconnected metal straps *2a*, *2b*, the space between these straps and the wall of the tube being occupied by the filler mass 4. The screen-side frame part *2b* is covered with the plastic foil 26 provided according to the present invention, this foil also covering the viewing screen 27 of the tube. The foil 26, or at least so much thereof as covers the screen 27, is transparent.

Figure 3:
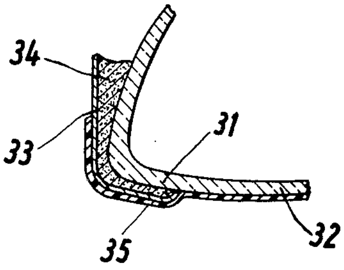
FIGURE 3 is a fragmentary sectional view of a cathode ray tube equipped with a one-piece implosion protective device according to the instant invention.

The foil will, of course, have to have sufficient mechanical and dielectric strength to meet the operating requirements. The provision of this foil also allows the frame to be made of a single metal piece, as shown in FIGURE 3. Here the cathode ray tube 31 having a viewing screen 32 is surrounded, in the region of maximum circumference, with a rigid one-piece metal frame 33, the space between the frame 33 and the wall of the tube 31 being occupied by the filler mass 34. A portion of the surface of frame 33 is insulated by means of the plastic foil 35 which, as explained above, can cover either only the frame 33 or also the viewing screen 32.

According to another feature of the present invention, the screen-side strap *2b* can be insulated by means of a plastic foil which may also be applied by the above-mentioned vacuum plating process. Such a foil can also cover the viewing screen. Due to the suction effect, the foil will be in intimate optical contact with the glass surface of the viewing screen. If desired, the foil can be colored in such a manner as to obtain a filter effect, or be calendered so as to obtain a reduced reflection effect.

According to another feature of the present invention, a frame-shaped cap made of insulating material is slipped from the front side of the tube over the rigid frame, the opening of which cap is so configured as to outline the viewing screen . Such a cap, which insulates the surface of the metal frame, makes it possible to obtain a sharp outline. Also, the cap may be colored to meet the requirements of the manufacturer of the sets incorporating the tube.

The cap has the further advantage that it can be used for holding a filter plate or the like in place. This is so because the edge of the cap which outlines the viewing screen firmly presses the filter plate against the front window of the tube.

Figure 4:
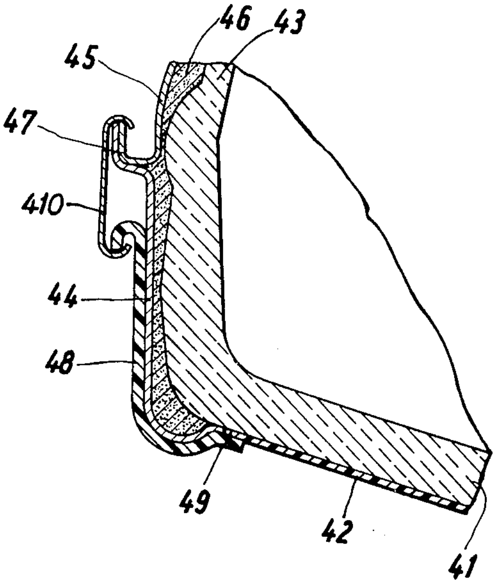
FIGURE 4 is a fragmentary sectional view of a cathode ray tube equipped with an implosion protective device including an insulating cap.

FIGURE 4 shows a cap according to the present invention. The front window of the screen portion 41 of the tube is covered with a filter or adapter plate 42, there being a rigid two-piece metal frame 44, 45, encompassing the tube wall portion 43 adjoining the screen portion 41. The interspace between the frame parts 44, 45 and the tube wall is occupied by a rigid filler mass 46, and the parts 44 and 45 are interconnected by means of a flange 47. A profiled cap 48 is slipped over the frame part 44, the inner edge portion 49 of which cap outlines the screen picture and therefore the actual image window. The edge portion 49 is, throughout its entire circumferential length, so fashioned as to be biassed against the screen 41 when the cap 48 is firmly in place over the part 44. The cap is suitably held in place, as, for example, by means of preferably resilient spring clips 410 which secure the cap 48 to the flange 47. These spring clips, of which only one is shown in FIGURE 4, are distributed over the circumference of the cap.

Dut to the inherent bias with which the edge portion 49 presses against the screen portion 41, the plate 42, which has an area larger than that of the actual viewing surface, is firmly held in place. In this way, the plate 42 is stretched tautly over the slightly arched screen portion 41 of the tube.

The cap 48 may consist of any suitable plastic. The circumference of the cap is such that it can be pulled over the part 44. The plate 42 can, for example, be a plastic foil which is finely rippled on that side thereof which faces away from the tube, the purpose of the plate being to blur the raster lines of the picture. Additionally or alternatively, the plate can be colored so as to obtain a filter effect, or have a roughened surface which reduces reflection.

Figure 5:
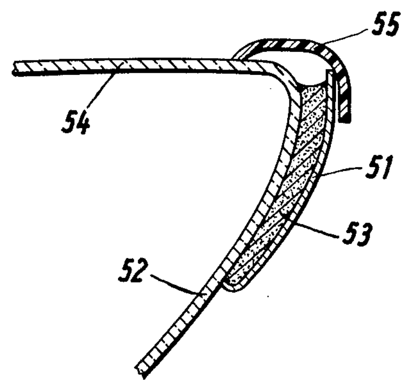
FIGURE 5 is a fragmentary sectional view of a cathode ray tube equipped with an implosion protective device including a modified insulating cap.
Figure 6:
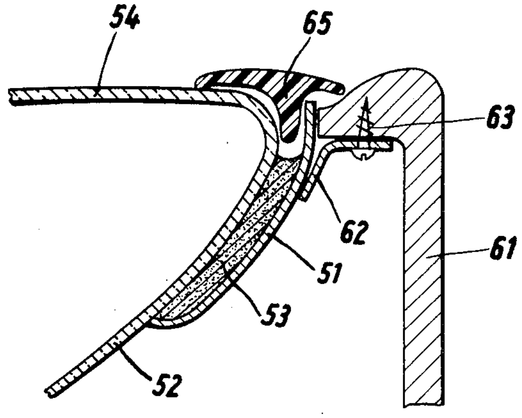
FIGURE 6 is a fragmentary sectional view of a cathode ray tube equipped with an implosion protective device including yet another modified insulating cap, FIGURE 6 also showing how the protective device is used as a means for securing the tube to the chassis of an apparatus of which the tube is a part.

The embodiments of FIGURES 5 and 6 show one-piece metal frames 51 which are mounted on the tube 52 from the cone side thereof. The interspace between the frame and tube wall is occupied by a filler mass 53. The frame 51 is covered by insulating caps 55 (FIGURE 5) or 65 (FIGURE 6) so as to prevent the uncovered metal from being touched from the front side of the tube. Here, too, the caps can be so configured as to outline the viewing screen 54 of the tube. Insofar as the cap 55 of FIGURE 5 is concerned, it will be seen from the drawing that the cap has a generally J-shaped cross-sectional configuration so as to have short and long arm portions, the short arm portion having its edge in contact with the screen portion 54 of the tube while the long arm portion encompasses the screen-side portion of the metallic frame 51.

FIGURE 6 also shows a portion of the chassis 61 of the apparatus, such as a television receiver, as well as the manner in which the tube is secured to this chassis by means of the frame 51. This may be accomplished by means of short straps 62, one of which is illustrated and shown as being affixed to the chassis with a screw 63.

It will be understood that the above description of the present invention is susceptible to various modifications, changes, and adaptations, and the same are intended to be comprehended within the meaning and range of equivalents of the appended claims.

What is claimed is:

1. An implosion protective device for a cathode ray tube having a screen portion and a cone portion joining said screen portion, the juncture of which portions constitutes the region of maximum circumference of the tube, said implosion protective device comprising a rigid metallic frame encompassing the tube in the region of said juncture, a portion of said frame being located in the vicinity of said screen portion of the tube, there being a filler mass interposed between the inner surface of said rigid metallic frame and the outer surface of the tube, and insulation overlying the exposed side of said screen-side frame portion thereby to prevent persons touching said screen-side frame portion from being subjected to a high electrical potential of a chassis to which the tube is connected by means of said frame.

2. An implosion protective device as defined in claim 1 wherein said insulation is constituted by a plastic coating.

3. An implosion protective device as defined in claim 2 wherein said plastic coating also covers the screen portion of the tube.

4. An implosion protective device as defined in claim 3 wherein said coating is a colored foil thereby to produce an optical filtering effect.

5. An implosion protective device as defined in claim 3 wherein said coating is a foil having a roughened surface for reducing reflection.

6. An implosion protective device as defined in claim 1 wherein said insulation is constituted by a frame-shaped cap covering said screen-side frame portion.

7. An implosion protective device as defined in claim 6 wherein said cap has a generally J-shaped cross-sectional configuration so as to have a short arm portion and a long arm portion, said short arm portion having an edge which is in contact with said screen portion of the tube and said long arm portion encompassing said screen-side frame portion.

8. An implosion protective device as defined in claim 6 wherein said cap has an inner edge portion configured to outline the viewing surface of said screen portion.

9. An implosion protective device as defined in claim 8, further comprising resilient means for securing said cap to said frame.

10. An implosion protective device as defined in claim 8 wherein said inner edge portion is biassed against the screen portion of the tube.

11. An implosion protective device as defined in claim 10 wherein a transparent plate is arranged in front of the screen portion of the tube, said plate having an area larger than that of the viewing surface of the screen portion, the edge portion of said plate being presssed against the screen portion of the tube by said biassed inner edge portion of said cap.

12. An implosion protective device as defined in claim 1 wherein said frame comprises, in addition to said screen-side portion, a second portion which is located in the vicinity of the cone portion of the tube, said two frame portions being connected to each other by a circumferential flange.

13. An implosion protective device as defined in claim 1 wherein said frame is made of a single piece of metal.

14. An implosion protective device as defined in claim 13 wherein said insulation is constituted by a cap overlying said frame.

15. An implosion protective device for a cathode ray tube having a screen portion and a cone portion joining said screen portion, the juncture of which portions constitutes the region of maximum circumference of the tube, said implosion protective device comprising a rigid metallic frame encompassing the tube in the region of said juncture, a portion of said frame being located in the vicinity of said screen portion of the tube and constituting a screen-side frame portion and another portion of said frame being located in the vicinity of said cone portion of the tube and constituting a cone-side portion, there being a filler mass interposed between the inner surface of said rigid metallic frame and the outer surface of the tube, at least the outer surface of said screen-side frame portion being made of insulating material thereby to prevent persons touching said screen-side frame portion from being exposed to a high electrical potential of a chassis to which the tube is connected by means of said frame.

References Cited by the Examiner

UNITED STATES PATENTS

| | | | |
|---|---|---|---|
| 2,293,529 | 8/42 | Bedford | 178—7.8 X |
| 2,436,847 | 3/48 | Wolfson. | |
| 2,503,813 | 4/50 | Fisch | 178—7.82 |
| 2,602,114 | 7/52 | Fisch | 178—7.82 |
| 2,644,854 | 7/53 | Sziklai | 178—7.86 X |
| 2,734,142 | 2/56 | Barnes | 178—7.85 X |
| 2,738,500 | 3/56 | Summerer et al. | 178—7.8 |
| 2,918,670 | 12/59 | Cusano et al. | 178—7.85 |
| 3,009,017 | 11/61 | Connor et al. | 178—7.85 |

DARRELL L. CLAY, *Primary Examiner.*

JOHN P. WILDMAN, JOHN F. BURNS, E. JAMES SAX, *Examiners.*

UNITED STATES PATENT OFFICE
CERTIFICATE OF CORRECTION

Patent No. 3,200,188 August 10, 1965

Herbert Lange et al.

It is hereby certified that error appears in the above numbered patent requiring correction and that the said Letters Patent should read as corrected below.

In the heading to the printed specification, line 10, for "Feb. 21, 1963" read -- Feb. 2, 1963 --.

Signed and sealed this 15th day of February 1966.

(SEAL)
Attest:

ERNEST W. SWIDER
Attesting Officer

EDWARD J. BRENNER
Commissioner of Patents